United States Patent

[11] 3,630,468

[72] Inventors William K. Christoffersen
Minneapolis;
James L. Keely, Wayzata; William T. Owens, Jr., Long Lake, all of Minn.
[21] Appl. No. 58,311
[22] Filed July 27, 1970
[45] Patented Dec. 28, 1971
[73] Assignee Washington Scientific Industries, Inc.
Long Lake, Minn.

[54] FILM HANDLING APPARATUS
7 Claims, 5 Drawing Figs.
[52] U.S. Cl................................................... 242/195,
226/91, 352/158
[51] Int. Cl...................................................... G03b 1/04,
G11b 15/32
[50] Field of Search........................................... 242/195,
201–204, 205–210; 352/157, 158; 226/91, 92

[56] References Cited
UNITED STATES PATENTS
3,136,464 6/1964 Schmid........................ 226/91
3,195,824 7/1965 Laa et al....................... 242/195
3,197,150 7/1965 Camras......................... 242/195 X
3,348,784 10/1967 Gardiner et al................ 242/197 X Primary Examiner—Leonard D. Christian
Attorneys—Thomas G. Devine and Lew Schwartz ABSTRACT: A sensing switch, when opened, provides a signal to stop the film threading operation and when closed provides a signal to unlatch a supply reel. A single-pole, single-throw switch is mounted adjacent a takeup reel and is opened by the forced motion of a movable flange on the takeup reel, such forced motion resulting from a film leader, whose width is larger than the biased dimension between the movable flange and a fixed flange being driven between them by a drive-out roller. Opening the switch causes a solenoid to be deenergized which allows the drive-out roller to move away from the leader. When the leader is removed from the takeup reel because of a rewind operation, the switch is closed, activating a solenoid which removes a latch from a plate upon which the supply reel is mounted, permitting the reel to be removed.

Patented Dec. 28, 1971

INVENTORS
JAMES L. KEELY,
WILLIAM K. CHRISTOFFERSEN,
BY WILLIAM T. OWENS

Thomas G. Devine
ATTORNEY

Patented Dec. 28, 1971

INVENTORS
JAMES L. KEELY,
WILLIAM K. CHRISTOFFERSEN,
BY WILLIAM T. OWENS

Thomas G. Devine

ATTORNEY

FILM HANDLING APPARATUS

BACKGROUND OF THE INVENTION

This invention relates to improvements in self-threading and rewind apparatus for film-viewing equipment. More particularly, it relates to microfilm viewing equipment wherein the microfilm reel is supplied in a cartridge assembly such as that taught in U.S. Pat. No. 3,150,840.

Advances in microfilm viewers have been made in order to provide more convenient, faster and less complicated motions on the part of the viewer in order to view the microfilm. Such advances have made the equipment much more sophisticated, but on the other hand, often very mechanically complex therefore expensive and subject to breakdown and malfunction. Our invention, by removing much of the mechanical apparatus, provides efficient, economical, fast and rugged advances in film self-threading and rewind.

BRIEF SUMMARY OF THE INVENTION

The equipment to which this invention relates has a supply reel wound with film having a stiff leader on the free end, and a takeup reel which is intended to receive the leader and wind the film when the equipment is being used in the forward direction. Between the two reels there is a viewing position where light is passed through the film and projected onto a screen after having been magnified and properly deflected. In our invention the takeup reel has one fixed and one movable flange. The movable flange is spring-biased toward the fixed flange to a predetermined distance therefrom, the predetermined distance being less than the leader attached to the free end of the film. When the equipment is turned on in the forward direction, a drive roller is moved into position against the leader while it is in the supply reel. The leader is driven to the takeup reel where it moves between the flanges causing the movable flange to move against its biasing spring. Adjacent the takeup reel is a single-pole, single-throw switch which is opened by the movable flange moving against its armature. When the switch is opened it deenergizes a solenoid which permits the drive roller to move away from the supply reel. When the tape is rewound onto the supply reel, the leader is withdrawn from the takeup reel permitting the movable flange to move back down to its predetermined distance from the fixed flange. This motion closes the single-pole, single-throw switch, causing a solenoid to be energized, removing a latch from the mounting plate of the supply reel. The latch is spring loaded in the latching position so that when the supply reel is put in place, the mounting plate is latched and the supply reel cannot be removed until the latch is automatically released by the action of the single-pole, single-throw switch.

Therefore an object of this invention is to provide cheap, rugged mechanisms for improving the self-threading feature of a film handling apparatus.

Another object is to provide a very fast response in the self-threading operation to prevent any damage to the film.

Another object is to provide a smooth entry to the takeup reel.

Still another object is to prevent the supply reel from being removed during operation of the apparatus.

Another object is to provide an automatic mechanism for releasing the supply reel when the operation has been completed.

Still other objects of this invention will become obvious when reference is made to the detailed description and claims that follow.

DETAIL DESCRIPTION OF THE INVENTION

Figure 1:
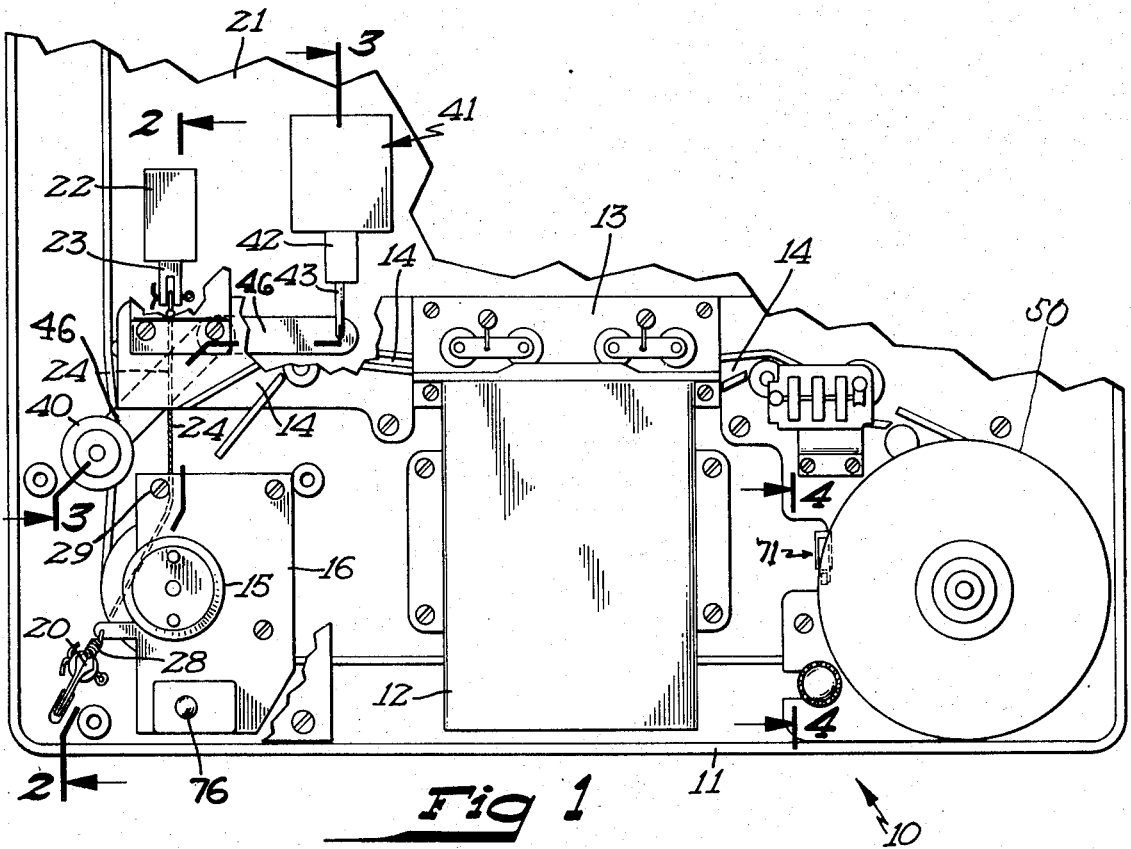
FIG. 1 is a partial plane view of the film handling apparatus with sections cut away to clearly illustrate features important to this invention.

Referring to FIG. 1, the film handling apparatus is referred to generally as 10 and its frame is shown as 11. Twelve (12) is a light source for shining through the film and 13 is a film gate for proper handling of the film when it is subjected to light. Fifteen (15) is the supply reel spindle and 50 is the takeup reel. Film is moved from the supply reel (not shown) through the film path 14 into the film gate 13 and finally onto the takeup reel 50. The sensing switch is shown generally as 71.

Figure 2:
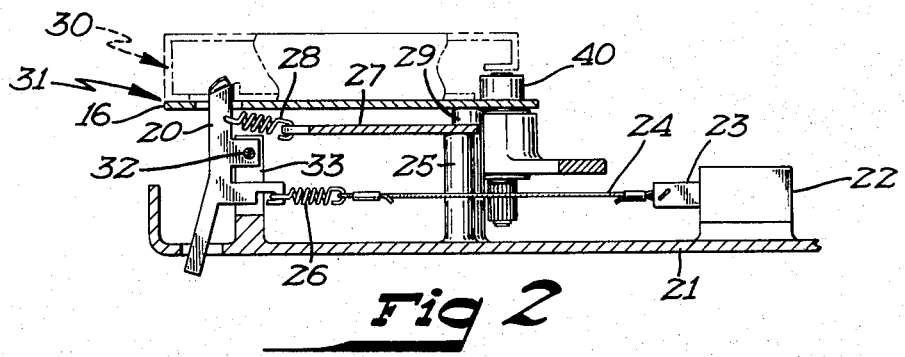
FIG. 2 is a sectional view taken along the line 2—2, showing the latch mechanism.

Refer now to FIG. 2 which illustrates generally a latch for securing a supply reel while the film handling apparatus is in motion. FIG. 2 illustrates the latch in the latched or deactivated position. Numeral 30 illustrates a film cartridge in phantom. A cartridge typically used for this purpose is taught in U.S. Pat. No. 3,150,840. The lower wall of the cartridge case, is referred to as the mounting plate and is shown as 31. The panel floor 16 supports the supply reel mechanism and the drive-out roller is shown generally as 40 (description follows later). Mounted upon the frame floor 21 is latch solenoid 22 with its armature 23 in the extended or inoperative position. Cable 24 is attached to latch solenoid armature 23 and bears against pivot pin 25. The latch is shown generally as 20 and is a lever whose upper and engaging end is flared. Latch 20 has a flat horizontal, notched arm disposed toward its lower end to which spring 26 is attached and has a flat, horizontal arm disposed toward its upper end for pivotal connection to latch bracket 33 through latch pin 32. Spring 28 is connected to the upper end of latch 20 and is anchored to latch anchor 27. Screw 29 passes through latch anchor 27 and engages bearing pin 25 thereby securing latch anchor 27.

Figure 3:
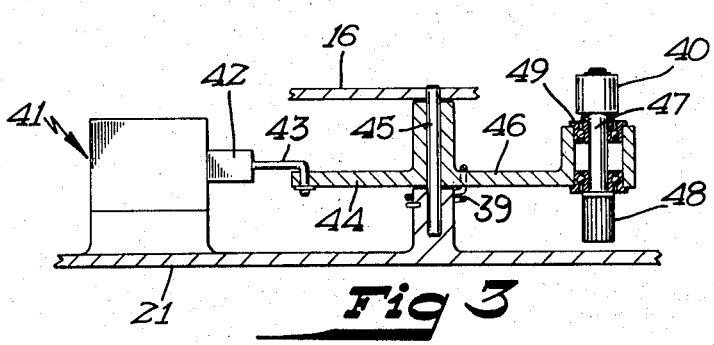
FIG. 3 is a sectional view taken along the line 3—3, showing the drive-out roller and its activating mechanism.

FIG. 3 shows frame floor 21 upon which is mounted drive-out roller solenoid 41 having an armature 42 and connecting link 43. A pivotal lever is shown generally as 46 and for a clearer understanding of its appearance, reference should be made to FIG. 1. FIG. 3 illustrates arm 44 of pivotal lever 46 pivotally connected to connecting link 43. Vertical pivot pin 45 is anchored in panel floor 16, passes through a hub section of pivotal lever 46 and is anchored in the frame floor 21. The other end of pivotal lever 46 terminates in a cylindrical section in which journal bearing 49 is inserted and through which shaft 47 passes. Forty-eight (48) is a drive hub turned by a belt (not shown). Forty (40) is the drive-out roller whose position should also be viewed in FIG. 1 for a better understanding. Spring 39 is attached to pivotal lever 46 and to frame floor 21, biasing the drive-out roller to the disengaged position, or as viewed in FIG. 3, in a clockwise direction.

Figure 4:
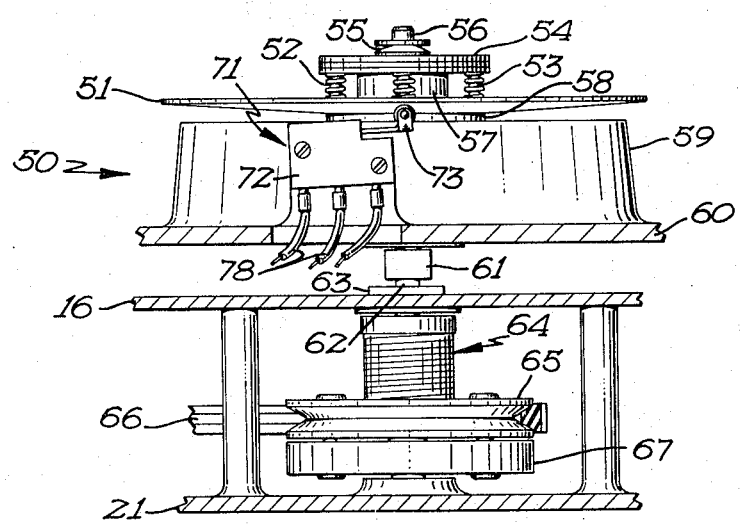
FIG. 4 is a sectional view taken along the line 4—4, illustrating the takeup reel, the drive mechanism for the takeup reel, and the sensing switch.

FIG. 4 illustrates a takeup reel shown generally as 50, the sensing switch shown generally as 71, and the driving mechanism for the takeup reel. While a detailed understanding of the driving mechanism is not necessary for an understanding of this invention, a brief description may be helpful. The driving mechanism is supported on frame floor 21. Belt 66 is powered by an electric motor (not shown) and engages pulley 65 which is connected to flywheel 67. A clutch assembly, shown generally as 64 is connected to pulley 65. Shaft 62 passed through bearing 63 and terminates at a connecting link 61 at its upper end and in a journaled hole in frame floor 21 at its lower end. Connector 61 is attached to the hub (not shown) of the takeup reel 50. A movable flange 51 is mounted on collar 57 and is urged toward hub 58 by compression springs 52 mounted on pins 53. Clutch assembly 54 bears on the springs and is retained by spring washer 55 and nut 56. Flange 60 is fixed and has an annular, vertical wall 59 which serves to prevent film being would on hub 58 from coming out of the takeup reel 50.

Sensing switch 71 is attached to vertical wall 59 by screws through switch bracket 72. Sensing switch 71 is opened when armature 73 engaging movable flange 51 moves upward, opening the switch contact (not shown) and stopping current flow in electrical conductor 78. It is closed when flange 51 moves downward.

Figure 5:
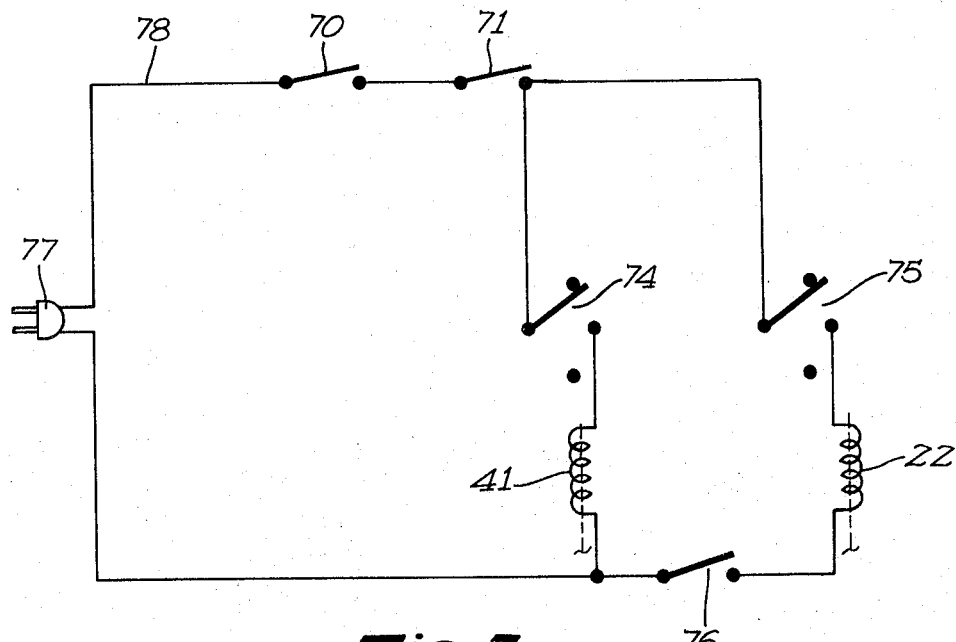
FIG. 5 is a simple schematic diagram showing the various electrical paths necessary to this invention.

FIG. 5 is a schematic showing electrical conductor 78 terminating in an attachment plug 77 for attachment to a power source. Switch 70 is an on-off switch (not shown elsewhere) for turning on the light source and activation of the system generally. Switch 74 is a control switch (not shown elsewhere) and when in the "advance" position is closed. Switch 75 is part of the control switch (not shown elsewhere) and is closed when the switch is in the "off" position. Drive-out roller solenoid 41 is connected to conductor 78 and also to switch 74. Latch solenoid 22 is connected to conductor 78 and also to switch 75. Supply reel switch 76 (see also FIG. 1) is attached in series in conductor 78 and is activated when a supply reel is placed into position. Seventy-one (71) is the sensing switch, connected in series in conductor 78, and is activated by motion of movable flange 51.

OPERATION

On-off switch 70 of FIG. 5 is closed by turning the switch to the "on" position. Supply reel switch 76 is closed by putting the supply reel in place. Sensing switch 71 is originally closed and therefore current flows in the circuit of FIG. 5 when control switch 74 is closed.

Referring to FIGS. 1 and 2, when the supply reel, in the form of film cartridge 30, is placed in position on supply reel spindle 15, supply reel switch 76 is depressed or placed in the "on" position. With reference to FIG. 2, latch solenoid 22 is not energized and therefore its armature 23 is in the extended position resulting in the latch 20 being essentially vertical as shown in FIG. 2. The flared end of latch 20 passes through an aperture in mounting plate 31 and thereby latches the supply reel in place.

The supply reel is would with film whose free end terminates in a leader (not shown). With the supply reel in place, the drive-out roller 40 engages the leader. With reference to FIG. 1, it can be seen that the leader is driven into film path 14 then into film gate 13, and finally through film path 14 to takeup reel 50. The leader is wider than the minimum dimension between movable flange 51 and fixed flange 60 of FIG. 4. The tapered underside of movable flange 51 aids the entry of the leader into the takeup reel 50. Since the leader is wider than the minimum dimension, flange 51 is urged in an upward direction. As flange 51 moves upwardly against the biasing force of compression springs 53, the armature 73 of sensing switch 71 moves upward and opens the contacts of the sensing switch. Now it can be seen that the electrical circuit is disabled.

When drive-out roller solenoid 41 is deactivated, FIG. 3 illustrates that its armature moves and through the armature link 43 permits the pivotal lever 46 to pivot on pivot pin 45 resulting in the drive-out roller 40 being moved away from the supply reel or in a clockwise direction as viewed from FIG. 3. Not vital to this invention but of help in understanding the operation is the fact that when solenoid 41 is deactivated, it closes a switch for a resultant slower speed of the driving mechanism of FIG. 4 which then causes the takeup reel 50 to rotate more slowly.

The contacts of switch 71 remain open throughout the forward direction operation of the film handling apparatus. When it is desired to rewind the film, the control switch (not shown) is placed in the rewind position and power is transferred to the takeup reel hub. With reference to FIG. 4, it can be seen that as the leader is withdrawn from takeup reel 50, the movable flange 51 is once again urged into its minimum spacing from fixed flange 60. Movable flange 51 bears against sensing switch armature 73 closing sensing switch 71. When rewind switch 75 is closed (placed in the "off" position) a circuit is completed through the latch solenoid 22. Referring to FIG. 2, armature 23 moves into the solenoid 22 pulling the lower end of latch 20 to the right by reason of tension being transmitted by spring 26 from cable 24 to the activated latch solenoid 22. With the flared end of the latch moved to the left, the supply reel can be readily removed. Switch 76 has a long lever which aids in the removal.

While the preferred embodiment has dealt specifically with film handling apparatus, those who are skilled in the art will readily realize that the same techniques can be applied to many other similar devices such as, but not limited to magnetic tape handling equipment and video tape handling equipment.

We claim:

1. In a machine having a supply reel wound with a filmstrip, a leader attached to the free end of the filmstrip, a takeup reel wherein the takeup reel has a hub and a pair of parallel flanges at least one of which is axially movable, means defining a minimum spacing between the flanges which is less than the width of the leader, biasing means urging the movable flange to a position of minimum spacing, first means for rotating the takeup reel in a forward direction, second means for rotating the supply reel in a rewind direction, a predetermined path for the filmstrip and the leader to traverse between the reels and means for driving the leader over the predetermined path to the takeup reel, the movable flange being moved axially against the biasing means to permit entry of the leader between the flanges, and to exert a frictional force on the edges of the leader so that it is propelled toward the hub when the first rotating means causes the takeup reel to rotate in the forward direction thereby causing the filmstrip to be wound on the takeup reel, the improvement comprising:
 a. sensing means, actuated by the axial movement of the movable flange against the biasing means,
 b. first disengaging means for disengaging the driving means, the first disengaging means being responsive to the sensing means and
 c. first connecting means connecting the sensing means to the first disengaging means so that when the sensing means is actuated the first disengaging means disengages the driving means.

2. The improvement of claim 1 wherein the surface of the movable flange facing the other flange is tapered outwardly to the edge of the movable flange to permit a smooth entry of the leader.

3. The improvement of claim 1 wherein the sensing means includes a single-pole, single-throw switch, the first connecting means includes an electrical conductor, and the first disengaging means includes a solenoid whose movable member is attached to the driving means, permitting the driving means to move away from the tape when the switch is actuated, and whose coil is connected to the electrical conductor.

4. The improvement of claim 1 further comprising:
 a. a mounting plate upon which the supply reel is rotatably mounted, the mounting plate having an aperture,
 b. latching means engaging the mounting plate through the aperture to firmly hold the mounting plate,
 c. second disengaging means movably attached to the latching means for disengaging the latching means, the second disengaging means responsive to the sensing means when the sensing means is actuated in the opposite direction, and
 d. second connecting means connecting the sensing means to the second engaging means so that when the supply reel is rotated in the rewind direction by the second rotation means, withdrawing the leader from the takeup reel and returning the sensing means to its oppositely actuated state, the second disengaging means disengages the latching means.

5. The improvement of claim 4 wherein the surface of the movable flange facing the other flange is tapered outwardly to the edge of the movable flange to permit a smooth entry of the leader.

6. The improvement of claim 4 wherein the latching means includes a lever, pivotally mounted, one end of which is biased toward an edge of the mounting plate surrounding the aperture, the second disengaging means includes a solenoid whose movable member is movably linked to the other end of the lever causing the biased end of the lever to move away from the edge when the solenoid is actuated, and the second connecting means includes an electrical conductor.

7. The improvement of claim 6 wherein the surface of the movable flange facing the other flange is tapered outwardly to the edge of the movable flange to permit a smooth entry of the leader.

* * * * *